Feb. 24, 1931. A. C. BRAMMER Re. 17,976

STUFFING BOX

Original Filed March 21, 1927

INVENTOR.
A.C. Brammer
BY B. F. Funk ATTORNEY.

Reissued Feb. 24, 1931

Re. 17,976

UNITED STATES PATENT OFFICE

ANTHONY C. BRAMMER, OF WICHITA, KANSAS, ASSIGNOR, BY DIRECT AND MESNE ASSIGNMENTS, OF TWO-THIRDS TO J. T. McINNES, OF TULSA, OKLAHOMA

STUFFING BOX

Original No. 1,736,646, dated November 19, 1929, Serial No. 177,170, filed March 21, 1927. Application for reissue filed April 14, 1930. Serial No. 444,333.

My invention relates to stuffing boxes, and more particularly to such a device adapted for use in connection with oil well pumping apparatus.

An important object of the invention is to provide a novel stuffing box construction for use with the polish rod of an oil well pumping apparatus to form an efficient packing against leakage.

A further object is to provide a stuffing box which will permit relatively slight lateral movement of the polish rod such as takes place during the normal operation of the pump when the latter is operated by the usual pump jack walking beam.

A further object is to provide a stuffing box having a chamber formed therein for the reception of lead or similar shot which are adapted to be maintained in contact with the polish rod to provide means for sealing against leakage.

A further object is to provide a hollow substantially cylindrical body, having a floating ring arranged within its lower portion and adapted to partake of limited lateral movement to permit the polish rod to alter its position as it is reciprocated by the usual pump jack walking beam.

A further object is to provide a stuffing box of the character just referred to wherein the body is provided above the floating ring with a chamber for the reception of lead or similar shot to effectually seal the polish rod against leakage during reciprocation.

A further object is to provide a retaining member within the body and resting upon the floating ring, and provided in its upper end with a conical recess for the reception of the shot, the recess being provided at its lower end with the horizontal annular shoulder to support the lowermost shot in contact with the polish rod.

A further object is to provide a stuffing box of the character just referred to, wherein the body is provided in its upper end with one or more resilient rings adapted to rest upon the shot, and to provide an adjustable gland adapted to exert suitable downward pressure upon the resilient ring and the shot to effectually seal the polish rod against leakage.

Other objects and advantages of the invention will become apparent during the course of the following description:

In the drawings I have shown one embodiment of the invention. In this showing:

Figure 1:
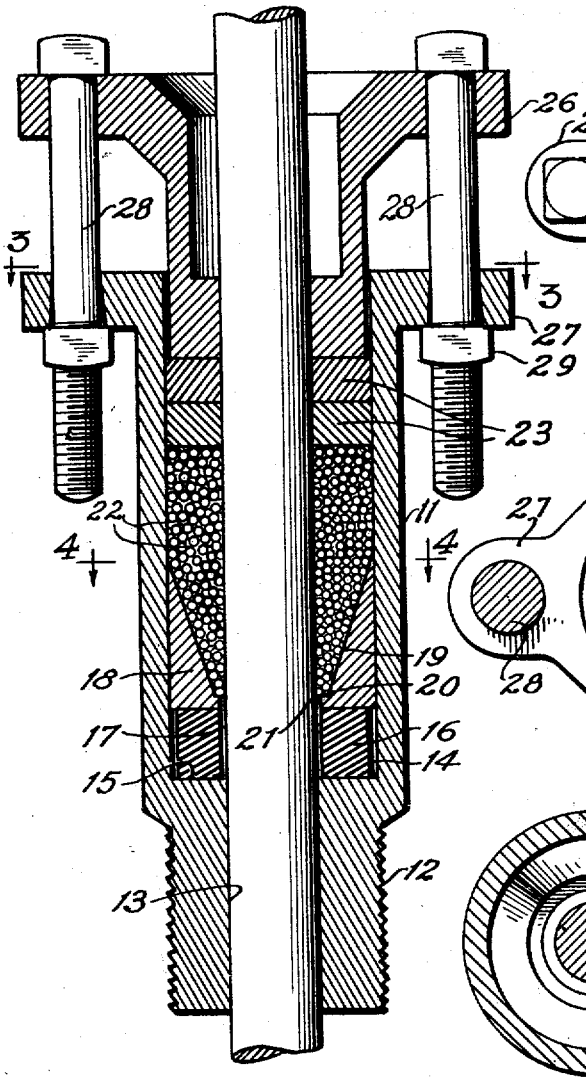
Figure 1 is a central vertical sectional view through the device.
Figure 2:
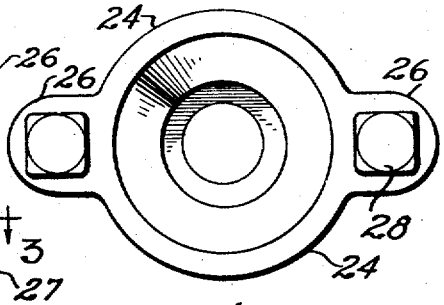
Figure 2 is a plan view.
Figure 3:
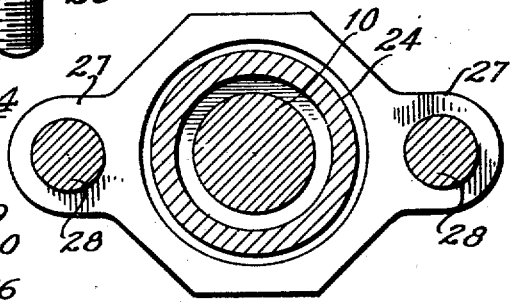
Figure 3 is a section on line 3—3 of Figure 1.
Figure 4:
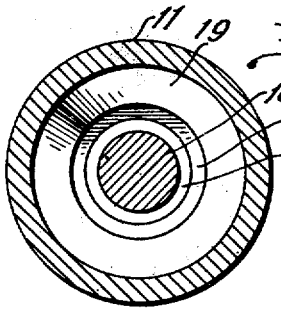
Figure 4 is a similar view on line 4—4 of Figure 1.

Referring to the drawings, the numeral 10 designates a polish rod of the usual construction employed in connection with oil well and similar pumps. Polish rods of this character ordinarily are reciprocated by means of a pump jack walking beam, and in practice it has been found that the polish rod under such conditions does not partake of true axial reciprocation, the upper end of the polish rod tending to incline toward the jack, whereby the upper portion of the rod partakes of slight lateral movement during reciprocation.

The polish rod is mounted to reciprocate vertically within a stuffing box body 11, which is substantially cylindrical and is threaded at its lower end as at 12 for connection with the associated elements of the pump. The lower end of the body is provided with an axial opening 13 loosely surrounding the polish rod to permit a slight lateral movement of the latter previously referred to. The body is further provided in its upper end with a cylindrical recess 14 which terminates at its lower end in a shoulder 15 for a purpose to be described.

A floating ring 16 is mounted in the lower portion of the recess 14 and is supported upon the shoulder 15, as clearly shown in Figure 1. This ring is preferably formed of bronze and is of an external diameter somewhat smaller than the internal diameter of the recess 14, the ring being provided with an axial bore 17, loosely surrounding the polish rod 10. It will be apparent that the floating ring is adapted to move laterally upon the shoulder 15 as the polish rod alters its position during reciprocation. The retaining member 18 is slidable within the recess 14 and is supported upon the upper face of the ring 16. The retaining member is provided in its upper end with a conical recess 19 which terminates at its lower end in a similar preferably cylindrical recess 20 of somewhat larger diameter than the polish rod. The lower end of the recess 20 terminates in a shoulder 21 for a purpose to be described. It will be apparent that the internal diameter of the member 18 below the shoulder 21 is substantially equal to the internal diameter of the floating ring 16.

The recess 19 and the interior of the recess 14 for some distance above the member 18 are adapted to form a chamber for the reception of lead or similar shot 22, as indicated in Figure 1. A pair of rubber or similar packing rings 23 are arranged within the upper portion of the recess 14 and rest upon the shot therein.

A packing gland 24 is employed for suitably compressing the shot 22. The gland is provided with a depending cylindrical portion which contacts with the uppermost packing ring 23. The polish rod extends through the axial bore 25 formed in the lower end of the gland as shown in Figure 1. At its upper end, the gland 24 is provided with a pair of diametrically opposite ears 26 corresponding in position to a pair of similar ears 27 formed on the upper end of the body 11. Bolts 28 extend through the corresponding ears and are adapted to be tightened by nuts 29.

The operation of the device is as follows:—

The device is particularly adapted for use in connection with the polish rods of deep well pumps in which structures, the pumping action is accomplished upon downward movement of the polish rod as distinguished from the operations of relatively shallow oil wells in which the pumping action is accomplished by upward movement of the rod. In practice, it has been found extremely difficult to provide a packing which is adapted to positively prevent leakage around the polish rod of a deep well pump, this difficulty being increased by the fact that large walking beams are employed for effecting vertical movement of the polish rods with the result that the latter are forced to partake of slight lateral movement. The present device has been found to provide efficient packing means for such polish rods. In assembling the device, the ring 16 is first placed in position after which the member 18 is inserted in the recess 14. A suitable quantity of shot then may be poured into the chamber, and it is preferred that lead shot be employed. After a suitable quantity of the shot is arranged in the device, the resilient rings are placed in position contacting with the top of the shot after which the gland is readily tightened in position. The latter operation is carried out in the usual manner and the nuts 29 may be tightened to provide suitable pressure. The pressure thus exerted causes the shot not only to pack closely and to firmly contact with the polish rod, but also tends to feed the shot downwardly. It will be obvious that by reason of the cone-shaped interior of the member 18, the polish rod on its downward movement will move the shot toward the bottom of the chamber until a portion of the shot is worn and formed about the rod in the form of a solid ring on the top of the shoulder 21 which acts as a supporting means for the worn shot and effectually stops any leakage of fluid. The solid ring is formed by packing the shot at the lower portion of the conical recess and since the shot is of soft material it is obvious that the reciprocating rod will pack the shot formed in the lower portion of the recess so that a tight seal is provided. The utilization of the movement of the polish rod for assisting in the packing of the shot in the manner referred to is possible only because of the fact that the polish rod is arranged vertically and the packing action is assisted by the conical shape of the inner face of the member 18 and the resilient downward force exerted by the rings 23. As previously stated, operation of the polish rod by means of the usual walking beam, the outer end of which travels in an arcuate path, causes the rod to partake of slight lateral movement and it will be obvious that the floating ring is adapted to move laterally to accommodate itself to the position of the rod without causing the ring to score the rod. It also will be apparent that the lateral alteration of the position of the polish rod is permitted by the body of the shot, the latter also changing position according to the lateral position of the polish rod. By providing the small recess 20 of slightly greater diameter than the rod, the shot are caused to be forced inwardly against the rod and to become flattened thereagainst to provide a perfect seal.

It is to be understood that the form of the invention herein shown and described is to be taken as a preferred example of the same, and that various changes in the shape, size and arrangement of parts can be made without departing from the spirit of the invention or the scope of the subjoined claims.

What I claim and desire to secure by Letters-Patent is:—

1. A stuffing box for vertical reciprocating rods comprising a vertical body provided in its lower end with an axial opening and in its upper end with an axial bore communicating with and substantially larger than said opening, said bore being provided at its inner end with a shoulder, said opening and said bore being adapted to receive the reciprocating rod, a ring arranged in said bore and supported on said shoulder, said ring being of smaller diameter than said bore to permit it to partake of lateral movement with respect thereto, a retaining member arranged in said bore and supported wholly on the upper face of said ring, said retaining member being provided in its upper portion with a conical recess terminating at its lower end in a relatively short cylindrical recess of slightly larger diameter than the rod, said recesses and a portion of said bore above said member constituting a packing chamber, a body of relatively small members constituting packing material arranged in said chamber, a packing gland having a portion projecting into the upper end of said bore and adapted to maintain said packing material under pressure.

2. A stuffing box for vertical reciprocating rods comprising a vertical body provided in its lower end with an axial opening and in its upper end with an axial bore communicating with and substantially larger than said opening, said bore being provided at its inner end with a shoulder, said bore and said opening being adapted to receive the reciprocating rod, a ring arranged in said bore and supported on said shoulder, said ring being of smaller diameter than said bore to permit it to partake of lateral movement with respect thereto, a retaining member arranged in said bore and supported on the upper face of said ring, said member being provided in its upper end with a conical recess terminating at its lower end in a relatively short cylindrical recess of slightly larger diameter than the rod, said member being further provided at the lower end of said cylindrical recess with a horizontal shoulder, said conical and cylindrical recesses and a portion of said bore above said member constituting a packing chamber, a body of relatively small members constituting packing material arranged in said chamber, a compressible ring arranged in said bore to contact with the upper surface of said packing material, a packing gland having a portion projecting into the upper end of said bore and contacting with said compressible ring to maintain said packing material under pressure, and means for adjustably connecting said gland with said body portion.

3. In combination, a vertical hollow stuffing box having a shot receiving chamber provided with a conical lower end surrounding an opening, a vertical reciprocatory member projecting through the opening into the chamber, and relatively soft pellets in the conical portion of the chamber adapted to be mashed together by movement of the member to form a solid packing ring between the edge of the opening and the member.

4. A stuffing box for vertical reciprocatory members comprising a hollow vertical body provided at its lower end with an axial opening, having sloping sides, a plurality of small lead pellets in said hollow body in intimate contact with the vertical reciprocatory member, the pellets adjacent to the opening being adapted to be mashed together when subjected to the downward movement of the vertical member, to form a solid sealing ring around the reciprocatory member.

5. A stuffing box for vertical reciprocatory members comprising a hollow vertical body provided at its lower end with an axial opening, a plurality of small lead pellets in the hollow body in intimate contact with the vertical reciprocatory member, the lower pellets being urged toward the reciprocatory member by the sloping sides of the conical end and adapted to be mashed together by the action of the reciprocatory member to form a solid sealing ring about the same.

In testimony whereof I affix my signature.

ANTHONY C. BRAMMER.